(12) United States Patent
Horiuchi

(10) Patent No.: US 8,984,437 B2
(45) Date of Patent: Mar. 17, 2015

(54) CONTROLLING DISPLAY OF A PLURALITY OF WINDOWS

(75) Inventor: Yoshio Horiuchi, Hiratsuka (JP)

(73) Assignee: International Business Machines Corporation, Armonk, NY (US)

( * ) Notice: Subject to any disclaimer, the term of this patent is extended or adjusted under 35 U.S.C. 154(b) by 2489 days.

(21) Appl. No.: 11/673,693

(22) Filed: Feb. 12, 2007

(65) Prior Publication Data

US 2007/0192733 A1 Aug. 16, 2007

(30) Foreign Application Priority Data

Feb. 13, 2006 (JP) .................................... 2006-35450

(51) Int. Cl.
*G06F 3/048* (2013.01)
*G06F 3/0483* (2013.01)

(52) U.S. Cl.
CPC .................................. *G06F 3/0483* (2013.01)
USPC ....................................................... 715/788

(58) Field of Classification Search
USPC ......... 715/781, 788, 790, 791, 796, 797, 802, 715/777, 710
See application file for complete search history.

(56) References Cited

U.S. PATENT DOCUMENTS

| | | | |
|---|---|---|---|
| 5,487,143 A | 1/1996 | Southgate | |
| 5,673,198 A | 9/1997 | Lawman et al. | |
| 6,031,530 A | 2/2000 | Trueblood | |
| 6,806,892 B1 | 10/2004 | Plow et al. | |
| 6,823,494 B2 * | 11/2004 | Minoura et al. | 715/800 |
| 6,981,223 B2 * | 12/2005 | Becker et al. | 715/753 |
| 7,523,397 B2 * | 4/2009 | Cheung et al. | 715/710 |
| 2001/0035882 A1 * | 11/2001 | Stoakley et al. | 345/779 |
| 2004/0061716 A1 | 4/2004 | Cheung et al. | |
| 2004/0066414 A1 * | 4/2004 | Czerwinski et al. | 345/781 |
| 2005/0060663 A1 | 3/2005 | Arkeketa et al. | |
| 2005/0071784 A1 * | 3/2005 | Klein et al. | 715/851 |
| 2005/0198589 A1 * | 9/2005 | Heikes et al. | 715/805 |
| 2005/0223069 A1 * | 10/2005 | Cooperman et al. | 709/206 |
| 2005/0262448 A1 * | 11/2005 | Vronay et al. | 715/767 |
| 2005/0278654 A1 * | 12/2005 | Sims | 715/790 |
| 2006/0005142 A1 * | 1/2006 | Karstens | 715/767 |

FOREIGN PATENT DOCUMENTS

| | | |
|---|---|---|
| EP | 1265157 A2 | 12/2002 |
| JP | 62-187333 U | 11/1987 |
| JP | 05189182 | 7/1993 |
| JP | 07-104965 | 4/1995 |
| JP | 10-124284 A | 5/1998 |
| JP | 2001-344131 A | 12/2001 |
| JP | 2002-328802 A | 11/2002 |
| JP | 2003-140798 | 5/2003 |
| KR | 10-2004-0072797 A | 8/2004 |
| TW | I224278 | 11/2001 |
| TW | 594556 | 6/2004 |

* cited by examiner

*Primary Examiner* — Rashawn Tillery
(74) *Attorney, Agent, or Firm* — Steven L. Nichols; Van Cott, Bagley, Cornwall & McCarthy P.C.

(57) ABSTRACT

A control method for controlling display on a display apparatus displaying a plurality of windows in an overlapping manner comprises detecting that contents to be displayed on at least one of the plurality of windows are updated, and displaying an update notification including information identifying a window having the updated display contents on an update notification window provided common to the plurality of windows, in response to the detection of an update of the display contents.

25 Claims, 10 Drawing Sheets

CONTROLLING DISPLAY OF A PLURALITY OF WINDOWS

BACKGROUND OF THE INVENTION

The present invention relates to controlling the display of windows. More particularly, the present invention relates to displaying a plurality of windows in an overlapping manner.

A multi-window system such as Microsoft® Windows® operating system, a system providing an integrated development environment for programs, and the like, simultaneously display a plurality of windows on a display apparatus for the purpose of providing various information to users (Microsoft and Windows are trademarks of Microsoft in the United States, foreign countries, or both). When all windows cannot be displayed within the screen of the display apparatus, these systems divide a plurality of windows into some groups and display the plurality of windows in an overlapping manner within the respective groups.

When a plurality of windows are displayed to an overlapping manner, priorities are usually set for the windows and thus a user can perform operations only on the topmost, active window among the windows. When the user wants to perform operations on a lower window or when the user wants to check display contents of a lower window, it is necessary to make the window active by clicking part of the window, for example. As such, in conventional multi-window systems, a window enabling a user to operate or check its contents is an active window only. Thus, for example, even if display contents of a lower window are updated during the operation on the active window or in association with the operation, the user cannot visually check the updated contents if the lower window is hidden. In order to notify the user of the update in the lower window, in Windows XP operating system, for example, an icon on a task bar corresponding to the lower window is caused to blink.

BRIEF SUMMARY OF THE INVENTION

According to one aspect of the present invention, a control apparatus for controlling display on a display apparatus displaying a plurality of windows in an overlapping manner comprises a detection unit for detecting that contents to be displayed on at least one of the plurality of windows are updated, and an update notification unit for displaying an update notification including information identifying a window having updated display contents on an update notification window provided common to the plurality of windows, in response to the detection of an update of the display contents by the detection unit.

According to another aspect of the present invention, a computer program product for controlling display on a display apparatus displaying a plurality of windows in an overlapping manner comprises a computer usable medium having computer usable program code embodied therewith. The computer usable program code comprises computer usable program code configured to detect that contents to be displayed on at least one of the plurality of windows are updated, and computer usable program code configured to display an update notification including information identifying a window having updated display contents on an update notification window provided common to the plurality of windows, in response to the detection of an update of the display contents.

According to yet another aspect of the present invention, a control method for controlling display on a display apparatus displaying a plurality of windows in an overlapping manner comprises detecting that contents to be displayed on at least one of the plurality of windows are updated, and displaying an update notification including information identifying a window having the updated display contents on an update notification window provided common to the plurality of windows, in response to the detection of an update of the display contents.

DETAILED DESCRIPTION OF THE INVENTION

Figure 1:
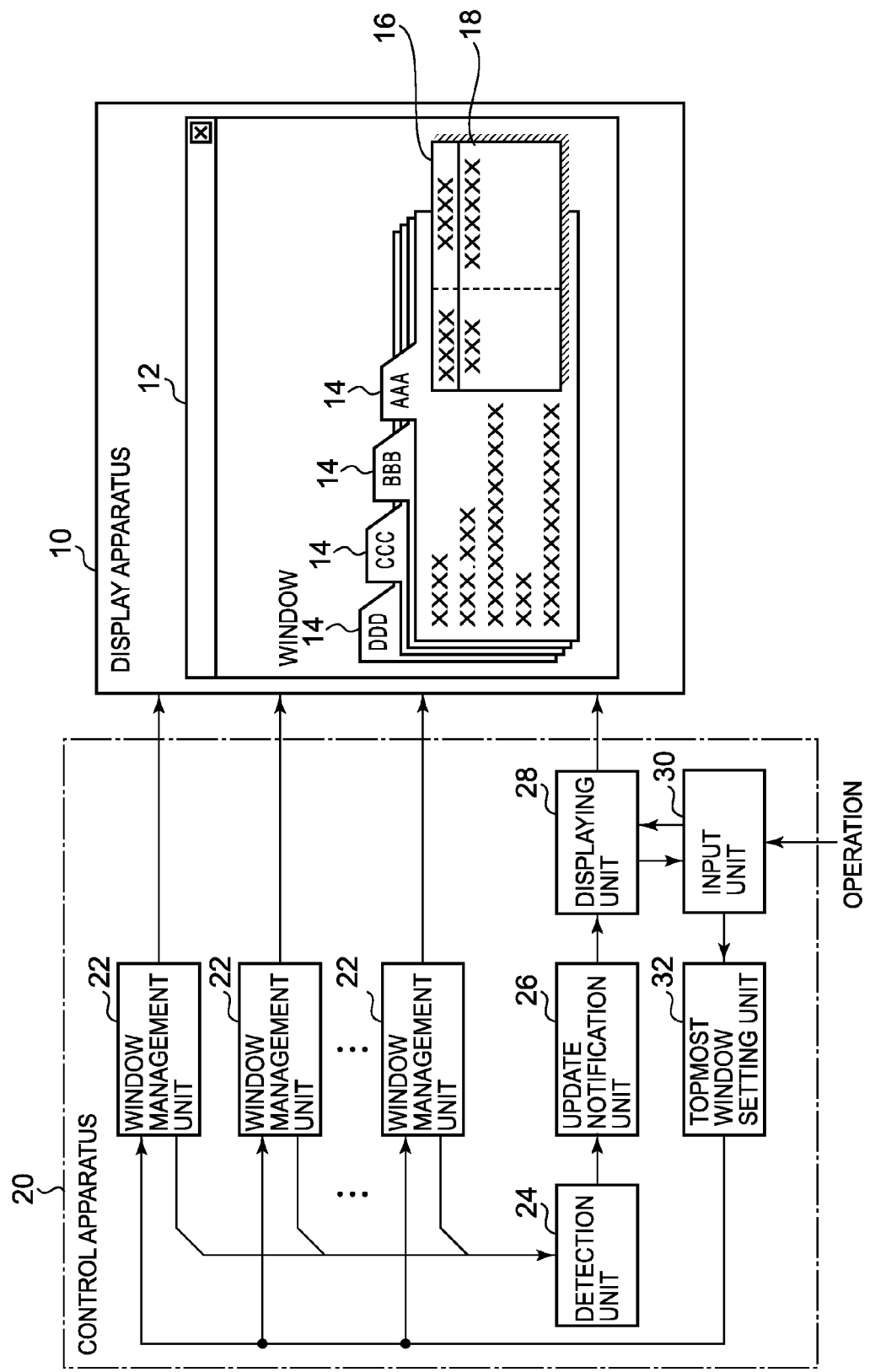
FIG. 1 shows a configuration of a display apparatus 10 and a control apparatus 20 according to the embodiment of the present invention.

The various aspects of the present invention may be embodied as a computer method, a system or computer program product. Also, various aspects of the present invention may take the form of an entirely hardware embodiment, an entirely software embodiment (including firmware, resident software, micro-code, etc.). Moreover, embodiments or aspects thereof, such as block(s) illustrated in the diagrams of the figures, may be generally referred to, either individually or collectively as a "circuit," "module" or "system." Furthermore, the various aspects of the present invention may take the form of a computer program product on a computer-usable storage medium having computer-usable program code embodied in the medium.

The software aspects of the present invention may be stored, implemented and/or distributed on any suitable computer usable or computer readable medium(s), including but not limited to, any medium that can contain, store, communicate, propagate or transport the program for use by or in connection with an instruction execution system of a corresponding processing device. The computer program product aspects of the present invention may have computer usable or computer readable program code portions thereof, which are stored together or distributed, either spatially or temporally across one or more devices. A computer-usable or computer-readable medium may comprise, for example, an electronic, magnetic, optical, electromagnetic, infrared, or semiconductor system, apparatus, device or propagation medium.

More specific examples of the computer usable or computer readable medium comprise for example, an electrical connection having one or more wires, a swappable intermediate storage medium such as floppy drive, tape drive, external hard drive, a portable computer diskette, a hard disk, a random access memory (RAM), a read-only memory (ROM), an erasable programmable read-only memory (EPROM or Flash memory), a portable compact disc read-only memory (CD-ROM) or digital video disk (DVD), an optical fiber or storage device, or a transmission media such as those supporting the Internet or an intranet. The computer-usable or computer-readable medium may also comprise paper or another suitable medium upon which the program is printed, as the program can be electronically captured, for example, via optical scanning of the paper or other medium, then compiled, interpreted, or otherwise processed in a suitable manner, if necessary, and then stored in a computer memory. The computer-usable medium may include a propagated data signal with the computer-usable program code embodied therewith, either in baseband or as part of a carrier wave or a carrier signal. The computer usable program code may also be transmitted using any appropriate medium, including but not limited to the Internet, wireline, optical fiber cable, RF, etc.

Computer program code for carrying out operations of the present invention may be written in any suitable language, including for example, an object oriented programming language such as Java, Smalltalk, C++ or the like. The computer program code for carrying out operations of the present invention may also be written in conventional procedural programming languages, such as the "C" programming language, or in higher or lower level programming languages. The program code may execute entirely on a single processing device, partly on one or more different processing devices, as a stand-alone software package or as part of a larger system, partly on a local processing device and partly on a remote processing device or entirely on the remote processing device or server. In the latter scenario, the remote processing device may be connected to the local processing device through a network such as a local area network (LAN) or a wide area network (WAN), or the connection may be made to an external processing device, for example, through the Internet using an Internet Service Provider.

FIG. 1 shows a configuration of a display apparatus 10 and a control apparatus 20 according to the present embodiment. The display apparatus 10 displays a plurality of windows 14 displaying information, in an overlapping manner on a display screen 12. By displaying the plurality of windows 14 in an overlapping manner, the display apparatus 10 can display portions of the windows 14 that are not hidden by higher windows 14, without displaying portions of the windows 14 that are hidden by the higher windows 14. In addition, the display apparatus 10 displays an update notification window 16 provided common to the plurality of windows 14, on the display screen 12.

The control apparatus 20 controls the display on the display apparatus 10. The control apparatus 20 includes a plurality of window management units 22, a detection unit 24, an update notification unit 26, a displaying unit 28, an input unit 30, and a topmost window setting unit 32. The window management units 22 display windows 14, respectively, on the display apparatus 10 and manage contents to be displayed on the respective windows 14. The control apparatus 20 prepares a window management unit 22 for each of the plurality of windows 14 displayed on the display apparatus 10. The window management units 22 are provided to implement functions depending on a program for displaying the windows 14 and thus may be provided from an operating system, an application program, or a user.

The detection unit 24 detects the contents to be displayed on at least one of the plurality of windows 14 are updated. For instance, the detection unit 24 may detect that the contents to be displayed on a window 14 are updated, by receiving notification that the display on the window 14 is updated form the window management unit 22.

The update notification unit 26 displays an update notification 18 including information identifying the window 14 having the updated display contents on the update notification window 16 provided common to the plurality of windows 14, in response to the detection of an update of the display contents by the detection unit 24. The displaying unit 28 causes to display the update notification window 16 to be displayed on the display screen 12 of the display apparatus 10 such that the update notification window 16 is not hidden by the plurality of windows 14, in response to the detection of an update of the display contents by the detection unit 24. Specifically, when displaying the update notification window 16 such that it is overlapped with the plurality of windows 14, the displaying unit 28 displays the update notification window 16 with higher priority than the topmost window 14 to thereby display the update notification window 16 such that it is not hidden by the plurality of windows 14. The update notification unit 26 may store, in a memory, the contents and update date of each update notification 18 displayed on the update notification window 16, and a method indicating operations performed when the update notification 18 is operated.

The input unit 30 inputs an operation made by a user on the update notification 18 displayed on the update notification window 16. The topmost window setting unit 32 detects that one update notification 18 displayed on the update notification window 16 is selected by the user, based on the operation inputted by the input unit 30. Then, the topmost window setting unit 32 displays a window 14 which corresponds to the one update notification 18 and having the updated display contents as the topmost window 14 among the plurality of windows 14, in response to the selection of the update notification 18 displayed on the update notification window 16 by the user. For example, the topmost window setting unit 32 notifies that the window 14 is to be displayed as the topmost window to the window management unit 22 which manages the window 14 to be displayed as the topmost window, so that the window 14 is displayed as the topmost window. Also, the topmost window setting unit 32 may read a method for the selected update notification 18, which has been written by the update notification unit 26, from the memory, to cause the corresponding window management unit 22 to perform the process described in the method.

According to the control apparatus 20 of the present embodiment, since when display contents of any of the plurality of windows 14 displayed in an overlapping manner are updated, the update notification window 16 having the displayed update notification 18 is displayed on the display apparatus 10, the update can be notified to the user. Accordingly, even when display contents of the window 14 which is displayed in an overlapping manner and thereby hidden are updated, it enables the user to recognize the update. Furthermore, since the control apparatus 20 displays the update notification 18 including information identifying the window 14, it enables the user to recognize which one of the plurality of windows 14 is updated.

Figure 2:
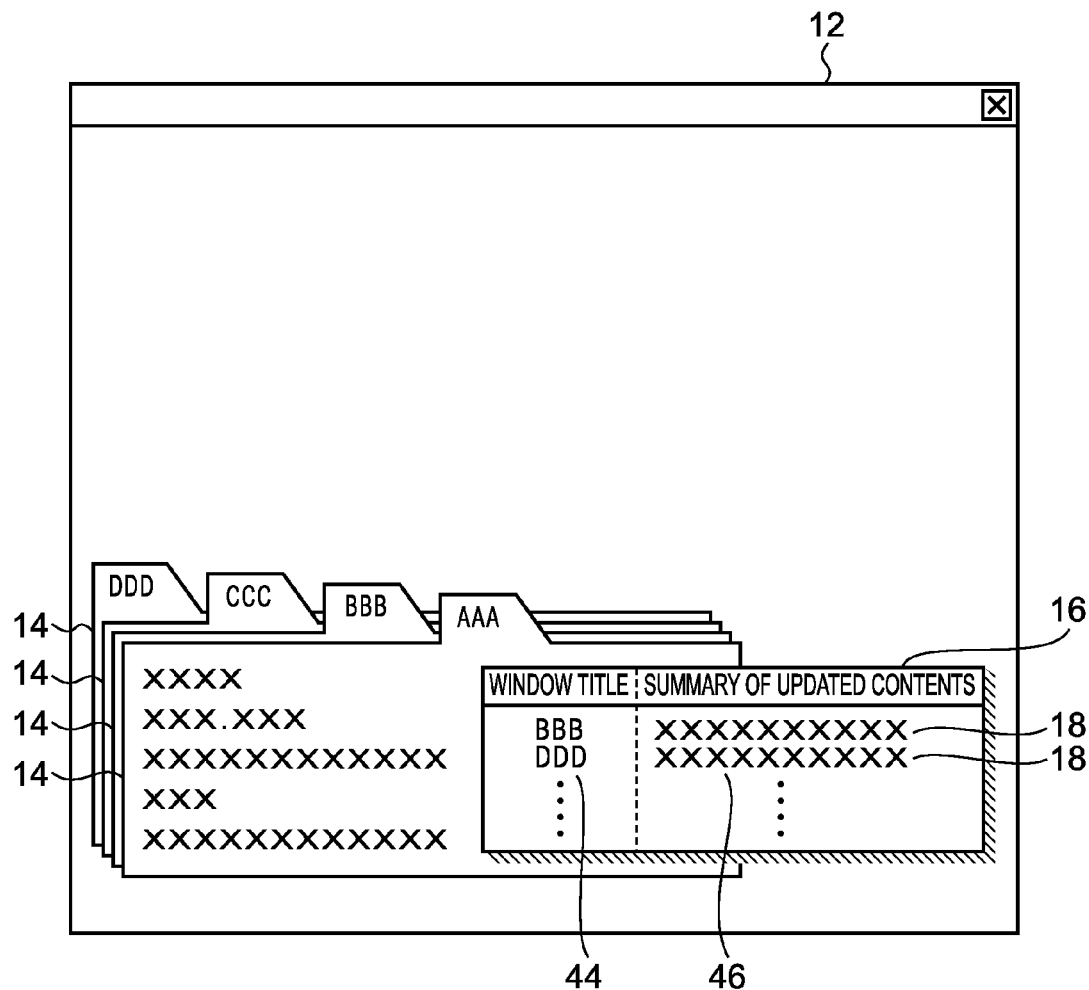
FIG. 2 shows an example of display of a plurality of windows 14 and the update notification window 16 on the display screen 12.

FIG. 2 shows an example of display of a plurality of windows 14 and the update notification window 16 on the display screen 12. For instance, the displaying unit 28 may display, as items included in each update notification 18, window identification information 44 indicating a title of a window 14 whose display contents are updated, and updated content information 46 indicating information specifying the updated contents or a summary of the updated contents on the update notification window 16. This enables the displaying unit 28 to present the user with the updated window 14 and specific updated contents. The displaying unit 28 may present a plurality of update notifications 18 in a time sequential list and display the time sequential list on the update notification window 16. This enables the displaying unit 28 to present the user with update history.

In addition, the displaying unit 28 may display the update notification window 16 immediately after the update is made in any of the windows 14, and erase the update notification window 16 after a certain period of time. Alternatively, after a certain period of time, the displaying unit 28 may display the update notification window 16 with lower priority than the topmost window 14 or may display the update notification window 16 in a minimized state. The displaying unit 28 may also perform a predetermined display process in response to the selection of the update notification 18 by the user, and thereafter, erase the update notification window 16. The displaying unit 28 may display the update notification window 16 including the update notification 18 already displayed, such that the update notification window 16 is not hidden by a plurality of windows 14, in response to a predetermined input made by the user, such as a predetermined shortcut key operation.

Also, the displaying unit 28 may display the update notification window 16 such that the update notification window 16 has a predetermined positional relationship with the updated window 14. Also, the displaying unit 28 may display the update notification window 16 such that the update notification window 16 overlaps with part of the display area of the updated window 14. For instance, the displaying unit 28 may display the update notification window 16 such that part of the updated window 14 and part of the update notification window 16 overlap with each other and the updated window 14 is on the left side and the update notification window 16 is on the right side. Thus, the control apparatus 20 enables the user to recognize the display position of the updated window 14 according to the display position of the notification window 16.

Also, the displaying unit 28 may not display the update notification window 16, on condition that display contents of the topmost window 14 among a plurality of windows 14 displayed in an overlapping manner is updated, and may display the update notification window 16 on condition that display contents of any of the windows 14 other than the topmost window 14 is updated. Particularly, the displaying unit 28 may not display the update notification window 16 on condition that only the topmost window 14 among a plurality of windows 14 displayed in an overlapping manner is updated, and may display the update notification window 16 on condition that any of the windows 14 other than the topmost window 14 is updated. Thus, according to the control apparatus 20, updated contents of the topmost window 14 are not hidden by the update notification window 16.

Figure 3:
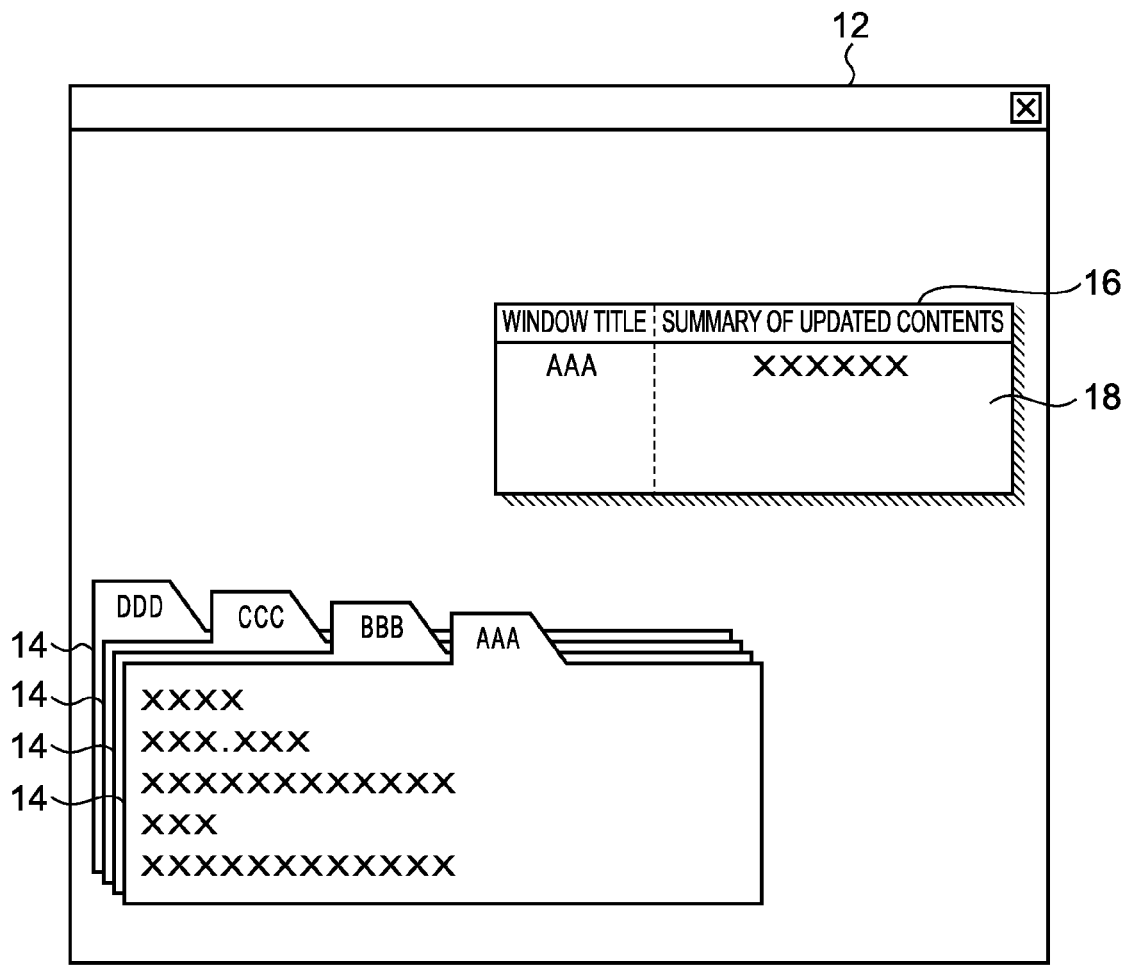
FIG. 3 shows an example of display of a plurality of windows 14 and the update notification window 16 displayed in a position where it does not overlap with the topmost window 14 on the display screen 12.

FIG. 3 shows an example of display of a plurality of windows 14 and the update notification window 16 displayed in a position where it does not overlap with the topmost window 14, on the display screen 12. The displaying unit 28 may display the update notification window 16 in a position where the update notification window 16 does not overlap wit the topmost window 14. Also, the displaying unit 28 may display the update notification window 16 in a position where the update notification window 16 does not overlap wit the topmost window 14, on condition that display contents of the topmost window 14 among a plurality of windows are updated, and may display the update notification window 16 above the plurality of windows 14, on condition that display contents of any of the plurality of windows 14 other than the topmost window 14 are updated. Thus, according to the control apparatus 20, updated contents of the topmost window 14 are not hidden by the update notification window 16.

Figure 4:
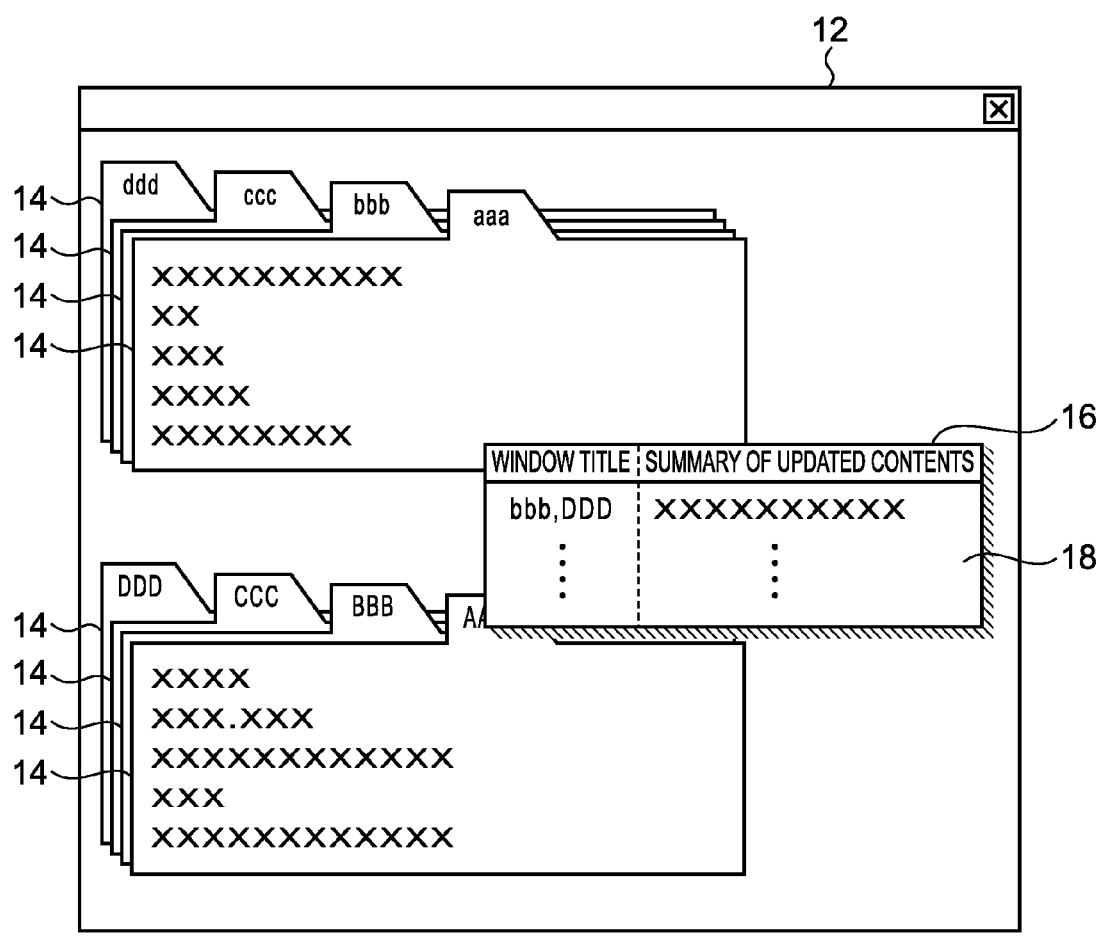
FIG. 4 shows an example of display of a plurality of windows 14 and the update notification window 16 displayed in a position according to the combination of updated windows 14, on the display screen 12.

FIG. 4 shows an example of display of a plurality of windows 14 and the update notification window 16 displayed in a position according to the combination of updated windows 14, on the display screen 12. The display apparatus 10 may divide a plurality of windows 14 into some groups and display the plurality of windows 14 in an overlapping manner within the respective groups. In this case, when one window 14 is updated, the displaying unit 28 may display the update notification window 16 such that the update notification window 16 is arranged in a predetermined positional relationship with the updated window 14.

Furthermore, when a plurality of windows 14 are updated, the displaying unit 28 may display the update notification window 16 in a display position on the display apparatus 10 determined based on the combination of the windows 14 where updates of the display contents are detected. For instance, the displaying unit 28 may display the update notification window 16 in an intermediate position between the display positions of the updated windows 14, or the displaying unit 28 may find an area covering a plurality of updated windows 14 and display the update notification window 16 such that the update notification window 16 is arranged in a predetermined positional relationship with that area. Thus, according to the control apparatus 20, even when a plurality of windows 14 have been updated, it enables the user to recognize the display positions of the updated windows 14 according to the display position of the update notification window 16.

Figure 5:
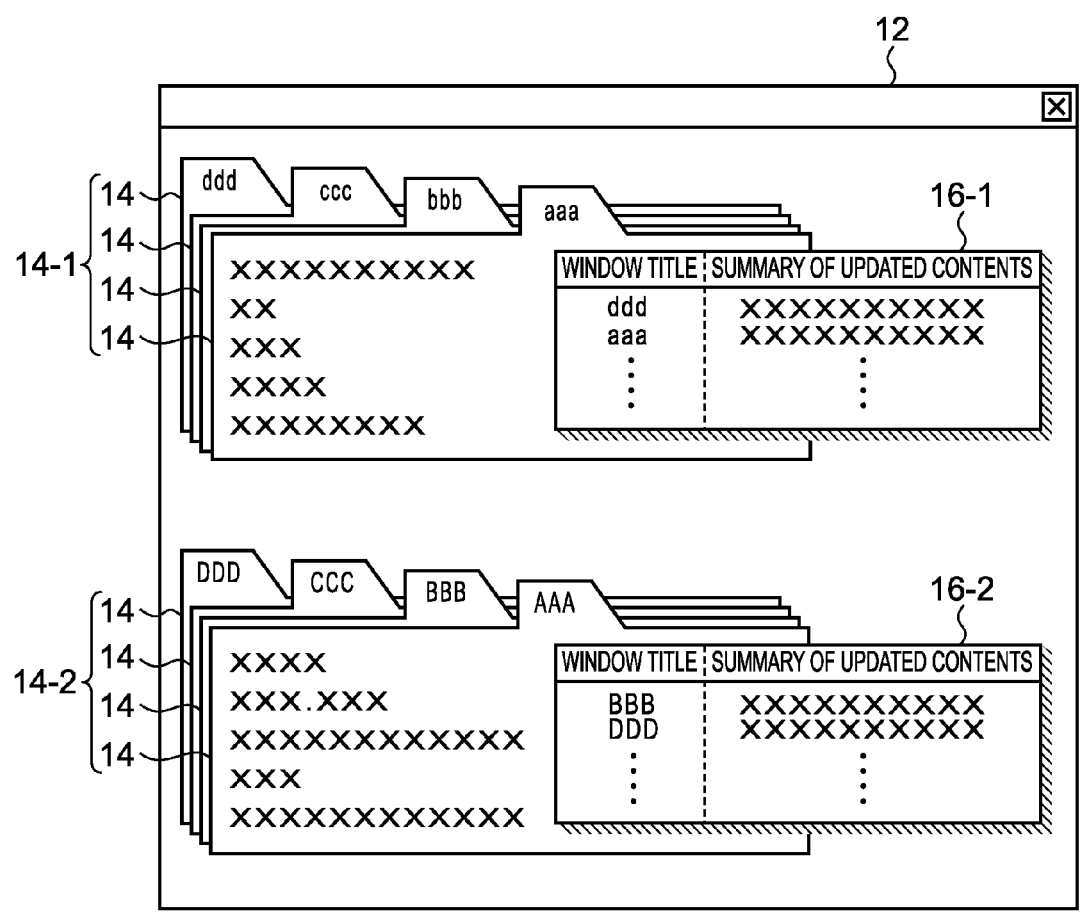
FIG. 5 shows an example of display of a plurality of windows 14 in two groups and two update notification windows 16 on the display screen 12

FIG. 5 shows an example of display of a plurality of windows 14 in two groups and two update notification windows 16 on the display screen 12. When the display apparatus 10 divides a plurality of windows 14 into some groups and displays the plurality of windows 14 in an overlapping manner within the respective groups, the displaying unit 28 may display a plurality of update notification windows 16 provided common to the windows 14 in the corresponding groups, respectively.

Specifically, the display apparatus 10 displays a plurality of first windows 14-1 overlapping with each other and a plurality of second windows 14-2 overlapping with each other. Then, the displaying unit 28 may display the update notification 18 on a first update notification window 16-1 provided common to the plurality of first window 14-1, in response to the detection of an update of display contents of at least one window 14 among the plurality of first windows 14-1. In addition, the displaying unit 28 may display the update notification 18 on a second update notification window 16-2 provided common to the plurality of second windows 14-2, in response to the detection of an update of display contents of at least one window 14 among the plurality of second windows 14-2.

Thus, according to the control apparatus 0, when a plurality of windows 14 are displayed in an overlapping manner for each group, individual update notification windows 16 for the respective groups can be displayed. As a result, the control apparatus 20 enables the user to recognize update history for each group.

Also, in the case where a plurality of first windows 14-1 are displayed overlapping with each other and a plurality of second windows 14-2 are displayed overlapping with each other, the displaying unit 28 may establish, in advance, an association between the plurality of first windows 14-1 and the first update notification window 16-1 and an association between the plurality of second windows 14-2 and the second update notification window 16-2, according to a user's operation, for example.

Also, in the case where a plurality of first windows 14-1 are displayed overlapping with each other and a plurality of second windows 14-2 are displayed overlapping with each other, the displaying unit 28 may display, in response to movement of one window 14 among the plurality of first windows 14-1 to a position where the one window 14 overlaps wit the plurality of second windows 14-2, the update notification 18 about the one window 14 on the second update notification windows 16-2, on condition that display contents of the one window 14 are updated. Thus, according to the control apparatus 20, when a plurality of windows 14 are displayed in an overlapping manner for the respective groups and one window 14 is moved to another group, the update notification 18 to be displayed on the update notification window 16 can also be moved along with the movement of the one window 14.

Also, in the case where a plurality of first windows 14-1 are displayed overlapping with each other and a plurality of second windows 14-2 are displayed overlapping with each other, the displaying unit 28 may move, in response to movement of one window 14 among the plurality of first windows 14-1 to a position where the one window 14 overlaps with the plurality of second windows 14-2, the update notification 18 about the one window 14 displayed on the first update notification window 16-1 onto the second update notification window 16-2. Thus, according to the control apparatus 20, when a plurality of windows 14 are displayed in an overlapping manner for the respective groups and one window 14 is moved to another group, the update notification 18 having been displayed on the update notification window 16 up to now can also be moved along with the movement of the one window 14.

Figure 6:
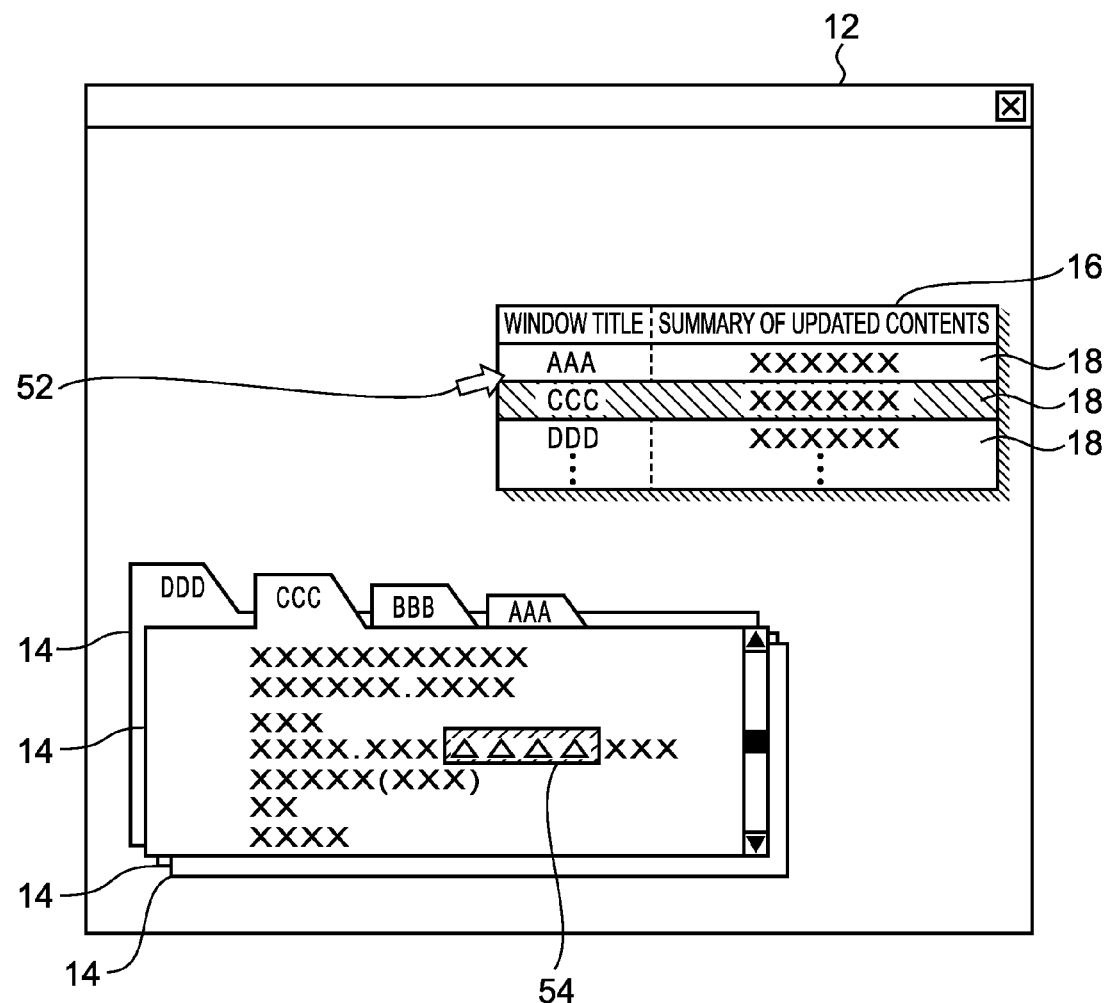
FIG. 6 shows an example of display of a plurality of windows 14 and the update notification window 16 on the display screen, in the case where a selected window 14 is the topmost window.

FIG. 6 shows an example of display of a plurality of windows 14 and the update notification window 16 on the display screen 12, in the case where a selected window 14 is brought into the topmost window. The topmost window setting unit 32 may display, in response to selection of one update notification 18 displayed on the update notification window 16 by a user, the one window 14 which corresponds to the update notification 18 and has updated display contents, as the topmost window 14 among a plurality of windows 14. For instance, when one of update notification 18 displayed on the update notification window 16 is selected by a mouse cursor 52 and clicked, the topmost window setting unit 32 may display the window 14 corresponding to the clocked update notification 18 as the topmost window 14.

Also, in this case, when part of the entire display contents of the window 14 corresponding to the selected update notification 18 is displayed, the topmost window setting unit 32 may move the updated portion 54 where the update to the display contents is made to a position where the user can view the updated portion 54, by scrolling the screen, for example. Thus, the control apparatus 20 enables the user to immediately recognize the updated portion 54.

Figure 7:
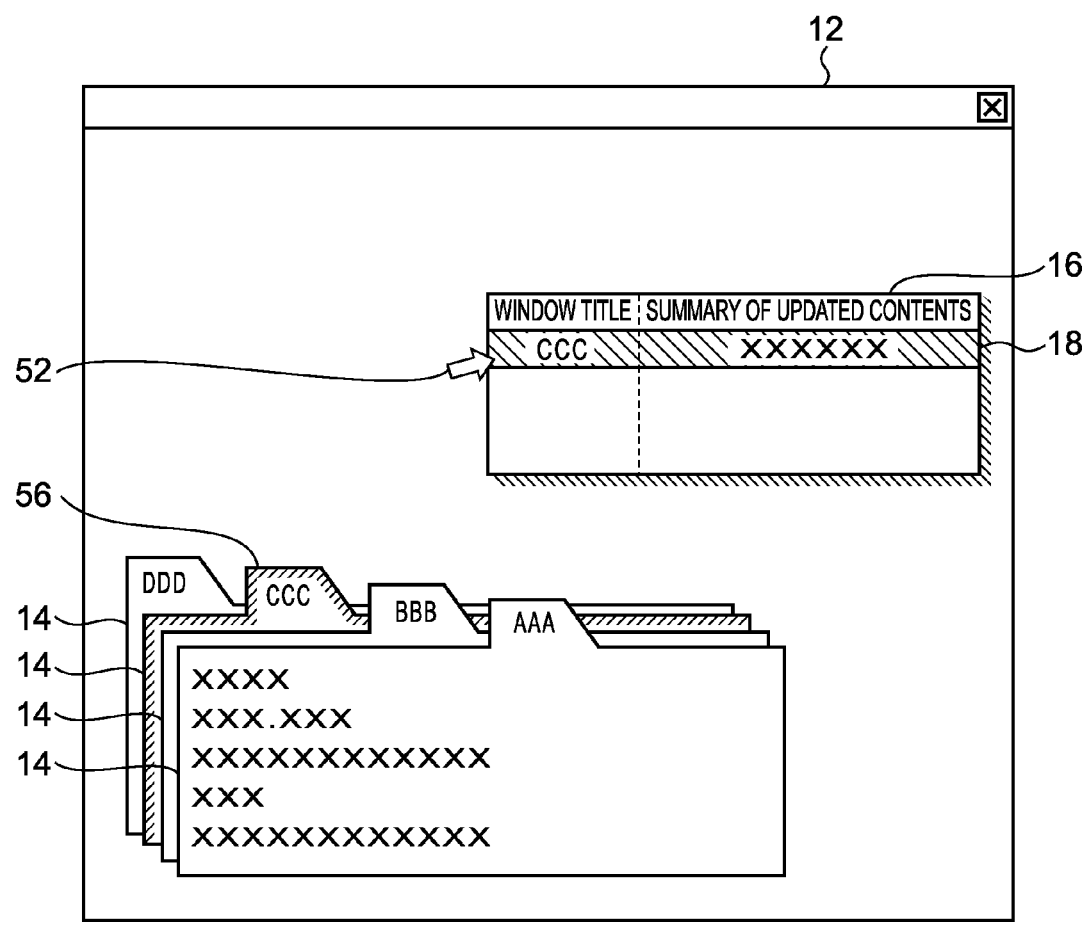
FIG. 7 shows an example of display of a plurality of windows 14 and the update notification window 16 on the display screen 12, in the case where a selected window 14 is highlighted.

FIG. 7 shows an example of display of a plurality of windows 14 and the update notification window 16 on the display screen 12, in the case where a selected window 14 is highlighted. In response to selection of one update notification 18 displayed on the update notification window 16 by a user, the topmost window setting unit 32 may markedly display the window 14 which corresponds to the one update notification 18 and has the updated display contents, while maintaining the overlapping state of the plurality of windows 14. For instance, the topmost window setting unit 32 may display, in response to selection of the update notification 18 by placing a mouse cursor 52 on the update notification 18 displayed on the update notification window 16, a highlighted portion 56 intended to distinguish from other windows 14, on the peripheral portion of the window 14 corresponding to the selected update notification 18. Thus, the control apparatus 20 enables the user to visually recognize an updated window 14.

Note that the method for displaying a plurality of windows 14 in an overlapping manner is not limited to those shown in the examples of FIGS. 1 through 7. For an example of the method for displaying a plurality of windows 14 in an overlapping manner, the display apparatus 10 may use a display method in which a window 14 corresponding to a selected tab is made to be the topmost window and only tabs are displayed for other windows 14 and thereby the other windows 14 are hidden, or may use a display method in which a lower window 14 is completely hidden by higher windows 14 and the lower window 14 is made to be the topmost window by minimizing the higher windows 14.

Also, the connection relationship of a plurality of windows 14 may be represented by a tree structure and the display apparatus 10 may display the plurality of windows 14 in an overlapping manner according to the tree structure. In this case, when a display/non-display operation is performed on a higher window 14 in the tree structure, the display apparatus 10 may allow one or more windows 14 placed in lower positions than the higher window 14, to be in a display/non-display state. Then, for instance, when display contents of a lower window 14 which is in a non-display state is updated, the displaying unit 28 may display the update notification window 16.

Figure 8:
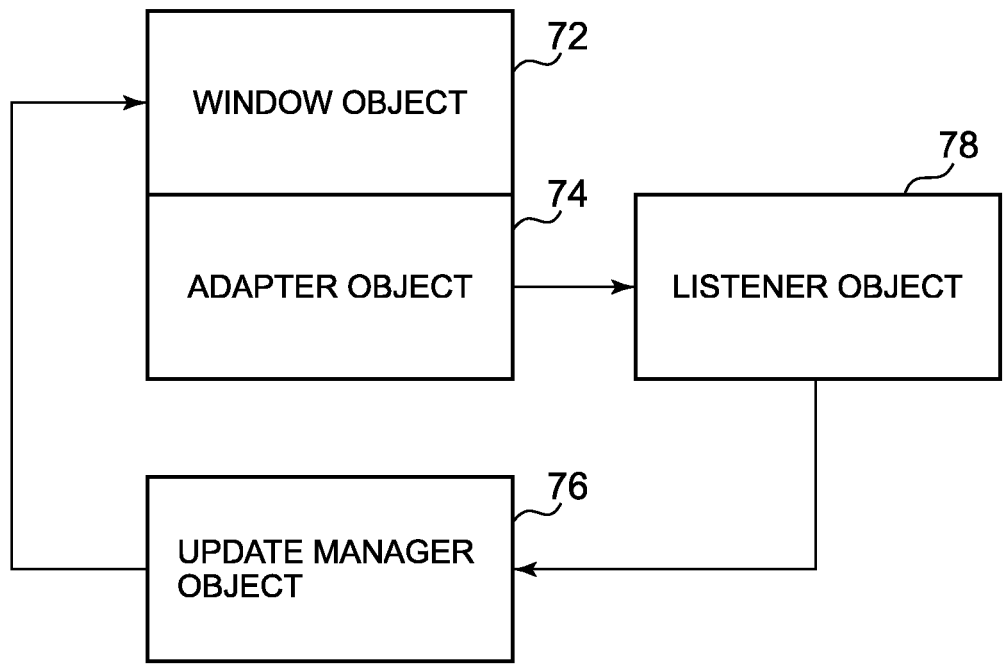
FIG. 8 shows an example of a configuration included in the program for causing a computer to operate as the control apparatus 20.

FIG. 8 shows an example of elements included in the program for causing a computer to operate as the control apparatus 20. The program for displaying a plurality of windows 14 generates a window object 72 and an adapter object 74 for each window 14. The window object 72 is an object managing its corresponding window 14. The adapter object 74 is an object intended to provide the corresponding window object 72 with advanced functions, without changing the window object 72. The adapter object 74 generates, on condition that the window object 72 updates display contents of the corresponding window 14, an event object including a context indicating the updated contents and a method for the operation.

In addition, the program for displaying a plurality of windows 14 generates an update manager object 76 managing the update notification window 16. The update manager object 76 is an example of an object implementing, by a computer, functions including the detection unit 24, the update notification unit 26, the displaying unit 28, the input unit 30, and the topmost window setting unit 32. The update manager object 76 registers, a listener object 78 for each of the adapter objects 74 corresponding to the respective windows 14. The listener object 78 is an interface making notification, when a display update event occurs in the window object 72, to an object (the update manager object 76 in the present embodiment) in which the listener object 78 is registered. The window object 72 whose corresponding adapter object 74 has the listener object 78 registered therefore operates as an object implementing, by the computer, the function of the window management unit 22.

Figure 9:
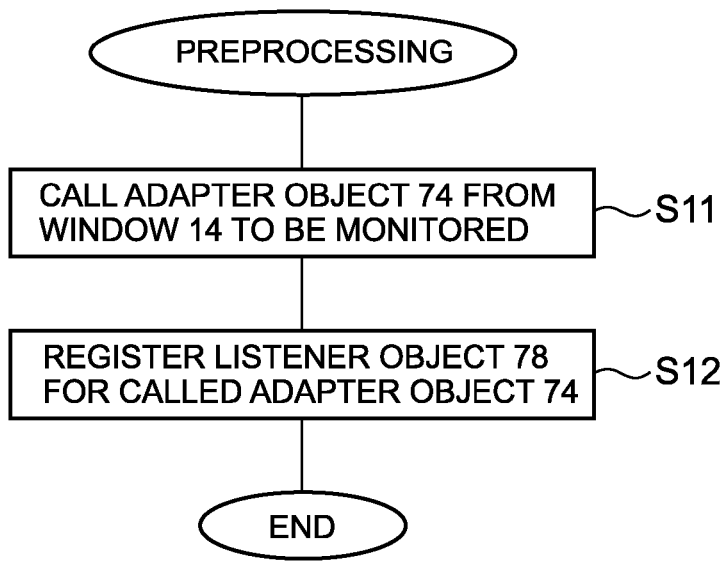
FIG. 9 is a flowchart showing a flow of preprocessing in the program shown in FIG. 8.

FIG. 9 shows a flow of preprocessing in the program shown in FIG. 8. First, the update manager object 76 calls a window object 72 for a window 14 for which an update of display is to be monitored, and obtains an adapter object 74 corresponding to the window 14 (S11). Then, the update manager object 76 registers a listener object 78 owned thereby for the obtained adapter object 74 (S12). Thereafter, when the window object 72 updates the display, the update manager object 76 can receive notification of an update event from the adapter object 74 via the listener object 78. The update manager object 76 performs the preprocessing steps S11 through S12 on all other windows 14 for which an update of display is to be monitored. Thus, the update manager object 76 can be prepared to receive update notifications for a plurality of windows 14.

Figure 10:
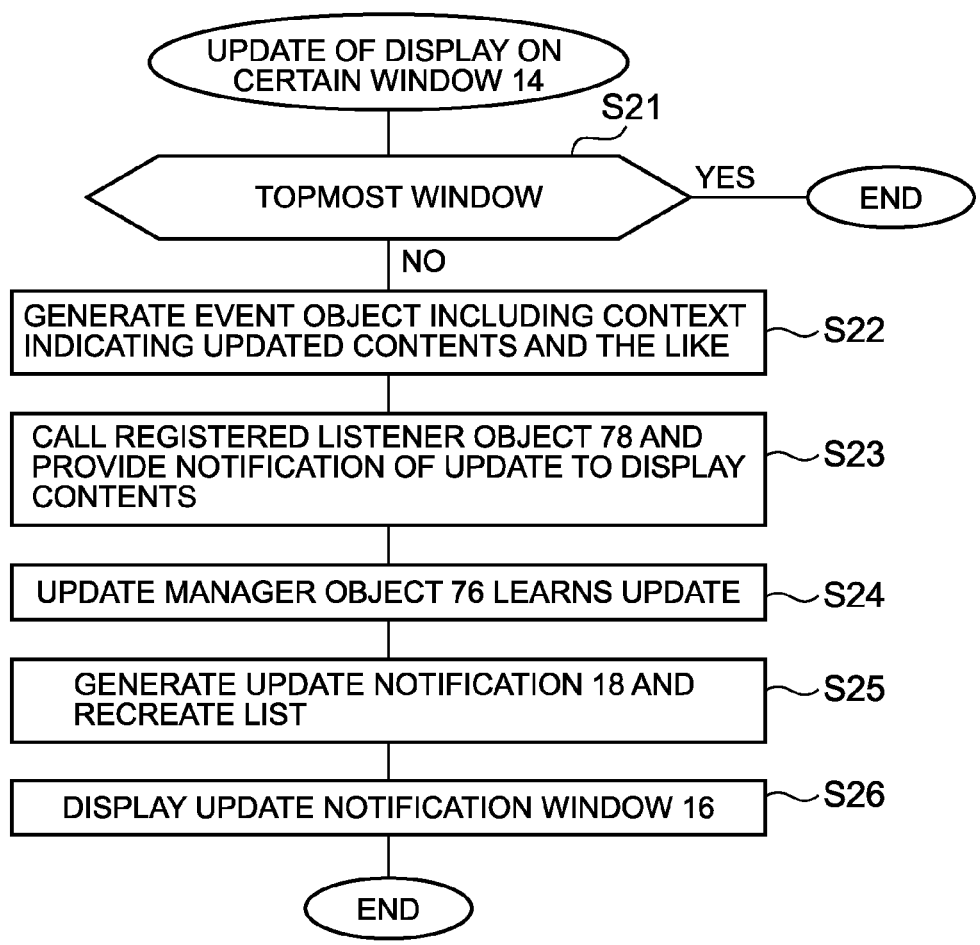
FIG. 10 is a flowchart showing a processing flow at the time of an update to display, in the program shown in FIG. 8.

FIG. 10 is a processing flow at the time of updating display, in the program shown in FIG. 8. First, when a window object 72 updates display on a window 14, the window object 72 determines whether the window 14 is the topmost window (S21). If it is the topmost window (YES at S21), the window object 72 ends the process. That is, in this case, the update manager object 76 does not display the update notification window 16.

If it is not the topmost window (NO at S21), an adapter object 74 added to the window object 72 generates an event object including a context indicating updated contents (S22). The adapter object 74 then calls a registered listener object 78 and provides notification of the update of the display contents via the listener object 78 (S23).

Next, when notification is provided form the listener object 78, the update manager object 76 learns the update of the display on the window 14 (S24). The update manager object 76 then calls an event object corresponding to the updated window 14 and generates the update notification 18 based on contents described in a context included in the event object (S25). For instance, the update manager object 76 generates an update notification 18 including window identification information 44 identifying the updated window 14 and updated content information 46 indicating a summary of the updated contents. Furthermore, the update manager object 76 adds the newly generated update notification 18 to a list of update notifications 18 generated so far to thereby recreate the list (S25).

The update manager object 76 then displays the update notification window 16 on which the recreated list is displayed, on the display screen 12 of the display apparatus 10 for a certain period of time, for example (S26). Thus, when the update of display is made on the window 14, the update manager object 76 can display the update notification window 16 on the display apparatus 10.

Figure 11:
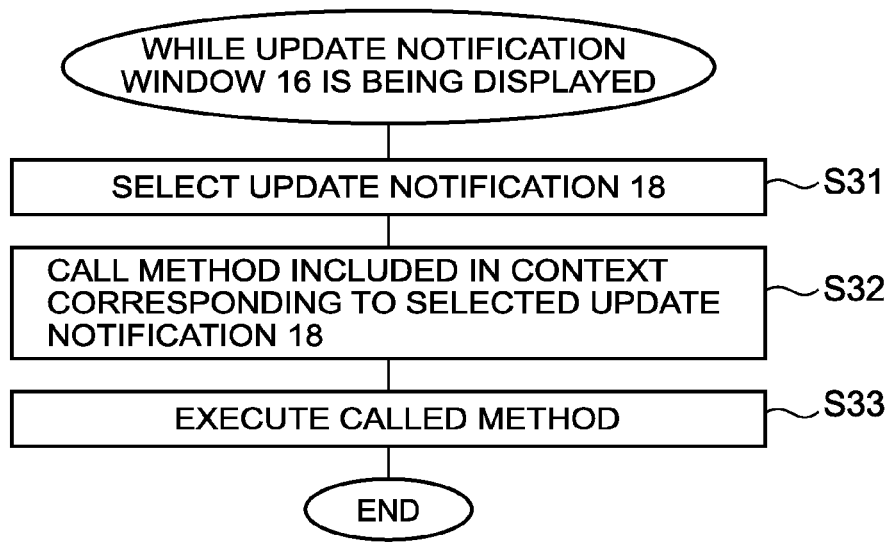
FIG. 11 is a flowchart showing a processing flow while an update notification window 16 is being displayed, in the program shown in FIG. 8.

FIG. 11 shows a processing flow while the update notification window 16 is being displayed, in the program shown in FIG. 8. While the update notification window 16 is being displayed, and when the update notification 18 displayed on the update notification window 16 is selected by, for example, a mouse cursor 52 (S31), the update manager object 76 calls a method included in the context corresponding to the selected update notification 18 (S32). The update manager object 76 executes the called method and allows the corresponding window object 72 to perform a predetermined process described in the method (S33). For instance, the window object 72 performs a process such as setting the window 14 managed thereby as the topmost window and moving the cursor to the updated portion. Thus, the window object 72 can improve user operability.

Figure 12:
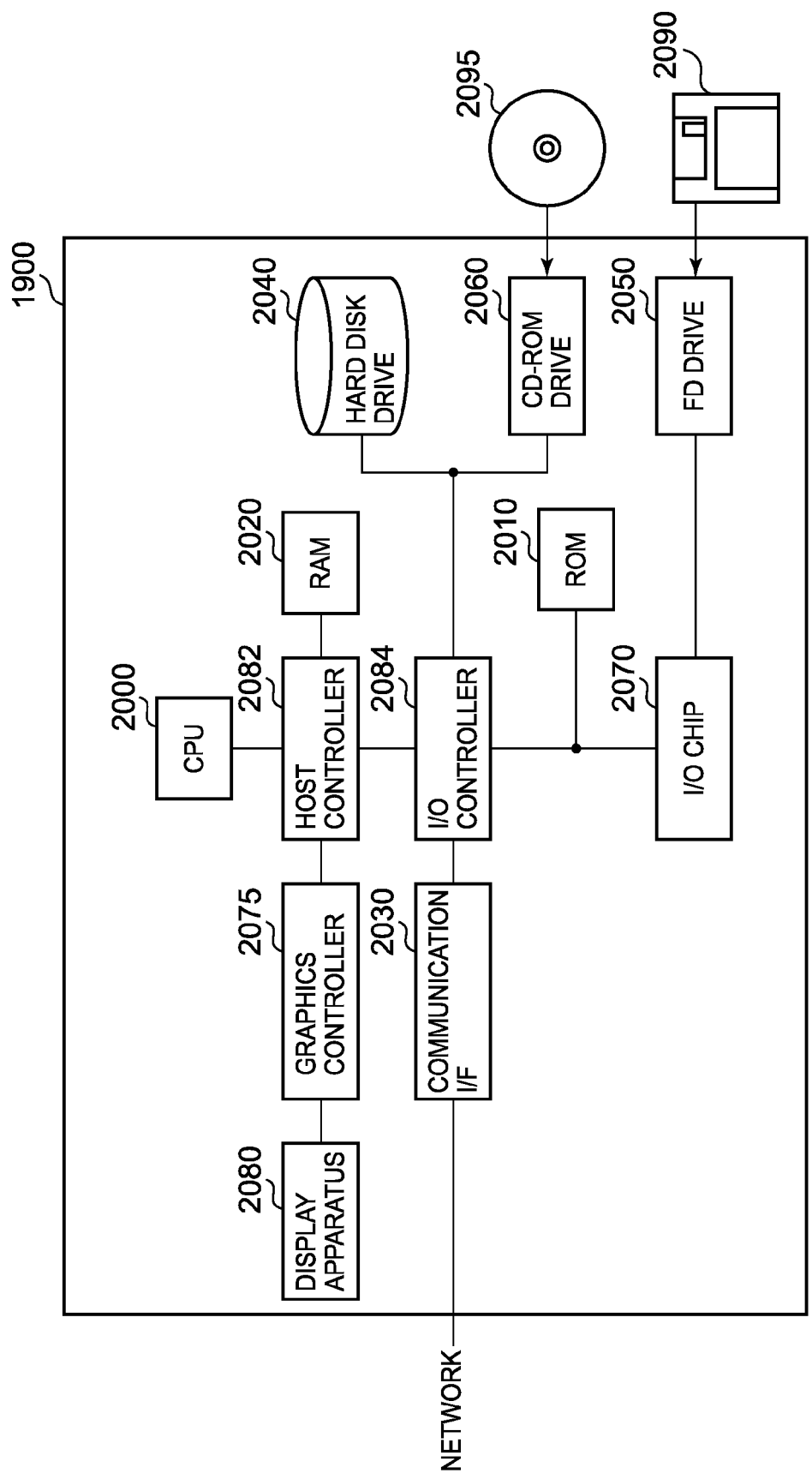
FIG. 12 shows an example of a hardware configuration of a computer 1900 according to the embodiment of the present invention.

FIG. 12 shows an example of a hardware configuration of a computer 1900 according to the present embodiment. The computer 1900 according to the present embodiment includes a CPU-related part having a CPU 2000, a RAM 2020, a graphics controller 2075, and a display apparatus 2080 which are interconnected by a host controller 2082, an input/output part having a communication interface 2030, a hard disk drive 2040, and a CD-ROM drive 2060 which are connected to the host controller 2082 by an input/output controller 2084; and a legacy input/output having a ROM 2010, a flexible disk drive 2050, and an input/output chip 2070 which are connected to the input/output controller 2084.

The host controller 2082 connects the RAM 2020 to the CPU 2000 and the graphics controller 2075 which access the RAM 2020 at a high transfer rate. The CPU 2000 operates based on programs stored in the ROM 2010 and the RAM 2020 and controls each unit. The graphics controller 2075 obtains image data generated by the CPU 2000 or the like, on a frame buffer provided within the RAM 2020 and displays the image data on the display apparatus 2080. Alternatively, the graphics controller 2075 may include therein a frame buffer storing image data generated by the CPU 2000 or the like.

The input/output (I/O) controller 2084 connects the host controller 2082 to the communication interface 2030, the hard disk drive 2040, and the CD-ROM drive 2060 which are relatively fast input/output devices. The communication interface 2030 communicates with other devices via a network. The hard disk drive 2040 stores programs and data to be used by the CPU 2000 included in the computer 1900. The CD-ROM drive 2060 reads a program or data from a CD-ROM 2095 and provides the read program or data to the RAM 2020 or the hard disk drive 2040.

Connected to the I/O controller 2084 are the ROM 2010, the flexible disk drive 2050, and the I/O chip 2070 which are relatively slow input/output devices. The ROM 2010 stores a boot program to be executed at the start-up time of the computer 1900, and programs dependent on the hardware of the computer 1900. The flexible disk drive 2050 reads a program or data from a flexible disk 2090 and provides the read program or data to the RAM 2020 or the hard disk drive 2040. The I/O chip 2070 connects to the flexible disk drive 2050 and various input/output devices via, for example, a parallel port, a serial port, a keyboard port, and a mouse port.

A program to be provided to the hard disk drive 2040 is provided in such a manner that the program is stored in a storage medium such as the flexible disk 2090, the CD-ROM 2095, or an IC card, and then provided by the user. The program is read form the storage medium, installed on the hard disk drive 2040 within the computer 1900, and executed by the CPU 2000.

The program installed on the computer 1900 to function as the control apparatus 20 contains a plurality of window management unit modules, a detection unit module, a update notification unit module, a displaying unit module, an input unit module, and a topmost window setting unit module. These programs or modules are executed by the CPU 2000 to cause the computer 1900 to function as a plurality of the window management units 22, the detection unit 24, the update notification unit 26, the displaying unit 28, the input unit 30, and the topmost window setting unit 32. Since the window management units 22 implement functions dependent on a program for displaying windows 14, the window management unit modules may be provided from another program (e.g., an operating system) in place of the program for causing the computer 1900 to function as the control apparatus 20.

The above-described programs or modules may be stored in an external storage medium. For the storage medium, in addition to the flexible disk 2090 and the CD-ROM 2095, an optical storage medium such as a DVD or a CD, a magneto-optical storage medium such as an MO, a tape medium, a semiconductor memory such as an IC card, or the like can be used. In addition, a storage apparatus, such as a hard disk or a RAM, provided on a server system connected to a dedicated communication network or the Internet may be used as a storage medium to provide the program to the computer 1900 via the network.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions, or corresponding hardware for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of described particular embodiments only and is not intended to be limited of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing form the scope of the invention defined in the appended claims.

What is claimed is:

1. A control apparatus for controlling display on a display apparatus displaying a plurality of windows in an overlapping manner, comprising:
    a detection unit for detecting that contents to be displayed on at least one of the plurality of windows are updated; and
    an update notification unit for displaying an update notification including information identifying a window having updated display contents on an update notification window provided common to the plurality of windows, in response to the detection of an update of the display contents by the detection unit.

2. The control apparatus according to claim 1, further comprising a displaying unit for displaying the update notification window on the display;
    wherein the update notification unit displays the update notification on the update notification window displayed by the displaying unit.

3. The control apparatus according to claim 2, wherein
    the displaying unit does not display the update notification window on condition that display contents of a topmost window among the plurality of windows are updated; and
    the displaying unit displays the update notification window on condition that display contents of any of the plurality of windows other than the topmost window are updated.

4. The control apparatus according to claim 2, wherein
    the displaying unit displays the update notification window in a position where the update notification window does not overlap with the topmost window among the plurality of windows on condition that display contents of the topmost window are updated; and
    the displaying unit displays the update notification window above the plurality of windows on condition that display contents of any of the plurality of windows other than the topmost window are updated.

5. The control apparatus according to claim 2, wherein the displaying unit displays the update notification window in a display position on the display apparatus determined based on the combination of windows where updates of the display contents are detected.

6. The control apparatus according to claim 2, wherein
    the display apparatus displays a plurality of first windows overlapping with each other and a plurality of second windows overlapping with each other; and
    the displaying unit displays the update notification on a first update notification window provided common to the plurality of first windows, in response to the detection of an update of the display contents on at least one of the plurality of first windows, and displays the update notification on a second update notification window provided common to the plurality of second windows, in response to the detection of an update of the display contents on at least one of the plurality of second windows.

7. The control apparatus according to claim 6, wherein in response to movement of one of the plurality of first windows to a position where the one window overlaps with the plurality of second windows, the displaying unit displays the update notification about the one window on the second update notification window, on condition that display contents of the one window are updated.

8. The control apparatus according to claim 6, wherein in response to movement of one of the plurality of first windows to a position where the one window overlaps with the plurality of second windows, the displaying unit moves the update notification about the one window displayed on the first update notification window onto the second update notification window.

9. The control apparatus according to claim 1, further comprising a topmost window setting unit for displaying, in response to selection of one update notification displayed on the update notification window by a user, a window which corresponds to the update notification and has the updated display contents as the topmost window among the plurality of windows.

10. The control apparatus according to claim 2, wherein the displaying unit displays, in response to a predetermined input made by a user, the update notification window including the already displayed update notification such that the update notification window is not hidden by the plurality of windows.

11. A computer program product for controlling display on a display apparatus displaying a plurality of windows in an overlapping manner comprising:
a non-transitory computer usable storage medium having computer usable program code embodied therewith, the computer usable program code comprising:
computer usable program code configured to detect that contents to be displayed on at least one of the plurality of windows are updated; and
computer usable program code configured to display an update notification including information identifying a window having updated display contents on an update notification window provided common to the plurality of windows, in response to the detection of an update of the display contents.

12. The computer program product of claim 11 further comprising computer usable program code configured to display the update notification window on the display apparatus such that the update notification window is not hidden by the plurality of windows, in response to the detection of an update of the display contents.

13. The computer program product of claim 12 further comprising computer usable program code configured to not display the update notification window on condition that display contents of a topmost window among the plurality of windows are updated; and
computer usable program code configured to display the update notification window on condition that display contents of any of the plurality of windows other than the topmost window are updated.

14. The computer program product of claim 12, further comprising:
computer usable program code configured to display the update notification window in a position where the update notification window does not overlap with the topmost window among the plurality of windows on condition that display contents of the topmost window are updated; and
computer usable program code configured to display the update notification window above the plurality of windows on condition that display contents of any of the plurality of windows other than the topmost window are updated.

15. The computer program product of claim 12, further comprising computer usable program code configured to display the update notification window in a display position on the display apparatus determined based on the combination of windows where updates of the display contents are detected.

16. A control method for controlling display on a display apparatus displaying a plurality of windows in an overlapping manner, comprising:
detecting that contents to be displayed on at least one of the plurality of windows are updated; and
displaying an update notification including information identifying a window having the updated display contents on an update notification window provided common to the plurality of windows, in response to the detection of an update of the display contents.

17. The method of claim 16 further comprising displaying the update notification window on the display apparatus such that the update notification window is not hidden by the plurality of windows, in response to the detection of an update of the display contents.

18. The method of claim 16 further comprising not displaying the update notification window on condition that display contents of a topmost window among the plurality of windows are updated; and
displaying the update notification window on condition that display contents of any of the plurality of windows other than the topmost window are updated.

19. The method of claim 16, further comprising:
displaying the update notification window in a position where the update notification window does not overlap with the topmost window among the plurality of windows on condition that display contents of the topmost window are updated; and
displaying the update notification window above the plurality of windows on condition that display contents of any of the plurality of windows other than the topmost window are updated.

20. A control apparatus for controlling display on a display apparatus displaying a plurality of windows in an overlapping manner, comprising:
a detection unit for detecting that content to be displayed on at least one of the plurality of windows has been updated; and
an update notification unit for displaying an update notification on said display apparatus, said update notification including an identification of which of said plurality of windows contains content for which an update has been detected by said detection unit.

21. The control apparatus of claim 20, wherein said update notification generated by said update notification unit additionally specifies what content was updated in an indicated window.

22. The control apparatus of claim 20, wherein said update notification unit displays said update notification such that said update notification overlaps a window indicated in the update notification as including updated content.

23. The control apparatus of claim 20, wherein said update notification unit displays said update notification in a display position determined based on the relative positions of multiple windows indicated in the update notification as including updated content.

24. A control apparatus for controlling display on a display apparatus displaying a plurality of windows in an overlapping manner, comprising:
a detection unit for detecting when content associated with one or more of said windows of said plurality of windows has been updated; and
an update notification unit for displaying an update notification on said display apparatus in response to output from said detection unit;
wherein, if said detection unit detects that content associated with one of said plurality of windows, which is not an active window of said plurality of windows, is updated, said update notification unit displays said update notification which identifies said window, which is not an active window of said plurality of windows, for which associated content has been updated.

25. The control apparatus of claim 24, wherein said update notification generated by said update notification unit additionally specifies what content was updated in an indicated window.

\* \* \* \* \*